A. B. CADMAN.
MAGNETIC TACHOMETER.
APPLICATION FILED MAY 16, 1910.
1,067,463.
Patented July 15, 1913.
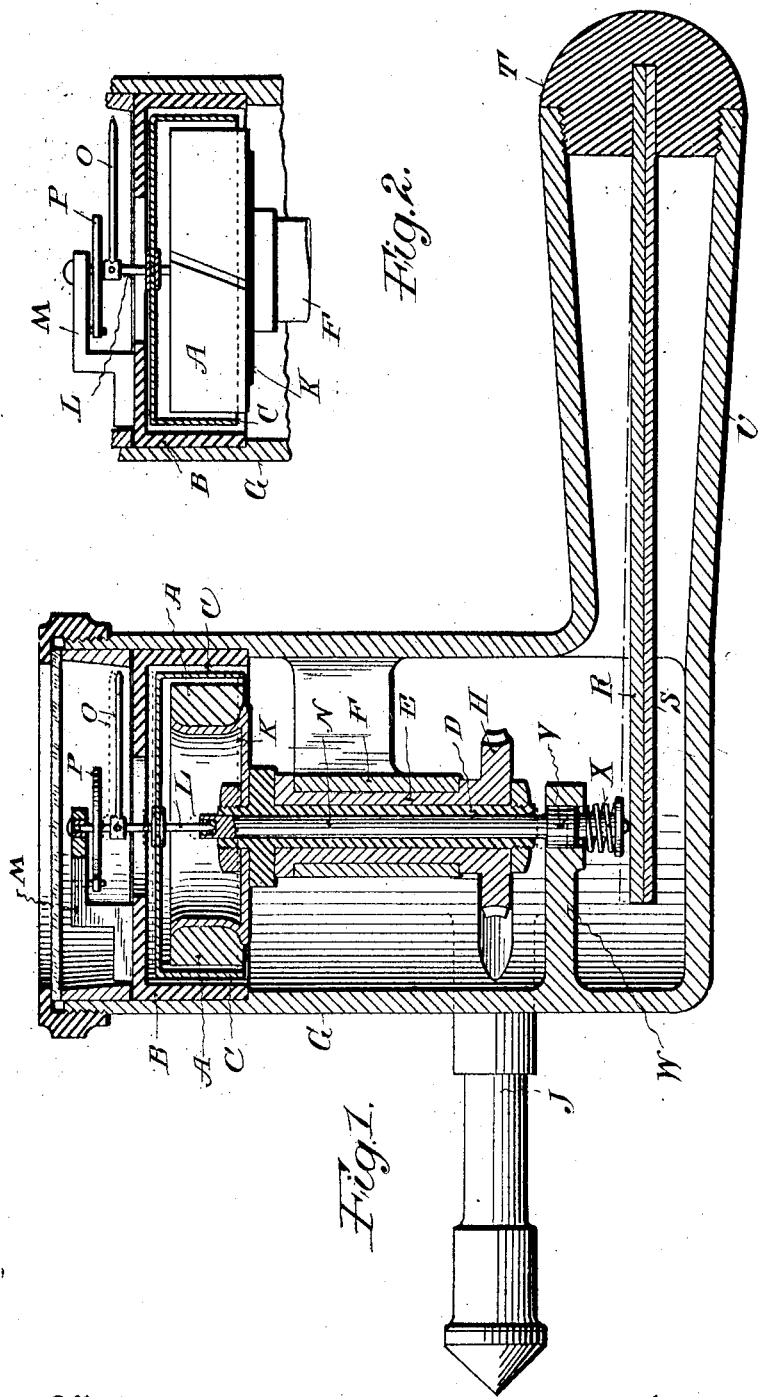

UNITED STATES PATENT OFFICE.

ADDI BENJAMIN CADMAN, OF BELOIT, WISCONSIN, ASSIGNOR, BY MESNE ASSIGNMENTS, TO STEWART-WARNER SPEEDOMETER CORPORATION, A CORPORATION OF VIRGINIA.

MAGNETIC TACHOMETER.

1,067,463. Specification of Letters Patent. Patented July 15, 1913.

Application filed May 16, 1910. Serial No. 561,536.

*To all whom it may concern:*

Be it known that I, ADDI BENJAMIN CADMAN, a citizen of the United States, residing at Beloit, county of Rock, State of Wisconsin, have made a certain new and useful Invention in Magnetic Tachometers, of which the following is a specification.

The invention relates to magnetic tachometers, and particularly to the type of devices of this nature as set forth, described and claimed in Patents No. 745,468, December 1, 1903, and No. 823,237, June 12, 1906.

The object of the invention is to provide means in a device of the nature referred to, for automatically correcting the scale reading for different atmospheric temperatures.

The invention consists substantially in the construction, combination, location and relative arrangement of parts, all as will be more fully hereinafter set forth, as shown in the accompanying drawing and finally pointed out in the appended claims.

In the drawing, Figure 1 is a view in central section of a magnetic tachometer showing the application thereto of means for automatically correcting the scale readings according to variations in atmospheric temperatures, in accordance with the principles of my invention. Fig. 2 is a similar view, parts broken away, showing a slightly displaced position of some of the parts.

A magnetic tachometer of the character and type set forth in the prior patents above referred to comprises in its essential characteristics, a magnet and a magnetic mass mounted for relative rotation with an independently rotative member interposed between the mass and magnet, whereby under the influence of the rotative magnetic field created by the relative rotation of the mass and magnet, a rotative movement is imparted to the interposed member, proportional in extent to the speed of rotation of the mass or magnet. The rotative movement thus imparted to the member is yieldingly opposed by a spring the tension of which is so adjusted and proportioned that a scale and pointer associated therewith will indicate the speed at which the rotating member is running. In the practical operation of a device having the characteristic features mentioned the scale readings are influenced by changes and variations in the magnetic and electric conditions due to changes and variations in atmospheric temperatures, which affect the relation of the parts, more or less, and the magnetic and electric conductivities thereof. In the Patent No. 823,237, it is proposed to correct this defect by automatically varying the magnetic reluctance in the field between the magnet and mass, and to effect such automatic variation by means of compensating thermostatic couples. The present invention contemplates a simple and efficient means for effecting the compensation of variations in scale readings by automatically varying the position of the interposed member by and in accordance with temperature changes, thereby varying the number of lines of force of the rotating magnetic field which are effective to rotate said member and hence varying in proportionate amount the rotative pull exerted on the said member.

In the drawing A is the magnet, B the magnetic mass, and C the member interposed therebetween. The mass and magnet are mounted for relative rotation. In this instance the magnet is mounted to rotate with a journal sleeve E, carried in a bearing F, inside a casing G, and to which rotation may be imparted from the shaft or other part, the speed of rotation of which is to be indicated. As shown the journal sleeve E, carries a worm-gear H, adapted to intermesh with and to be driven by a gear (not shown) on a shaft J, which is designed to be driven from the shaft or other part, the speed of which is to be indicated. The magnet A, in the form shown, comprises a split ring supported on a carrier K, which is clamped to one end of the sleeve D, to revolve therewith. The magnetic mass B, in this case is shown as being cup-shaped, and rigidly mounted within the casing G, in inverted inclosing relation with respect to the rotating magnet. The member C, is, in this instance, also in the form of an inverted cup and is nested within the mass and between the same and the magnet, being supported on a spindle L, journaled at one end in a bearing formed in a bracket M, and at the other end stepped in a bearing seat formed in one end of a rod N, arranged to extend longitudinally through the hollow sleeve D. The spindle L, carries a pointer O, designed to coöperate with a suitable and convenient graduated scale. A spring P, has one end connected to the spindle L, and the other to the bracket M. At its lower end the rod N, rests upon a thermo-couple, which, in the form selected for illustrating my invention, consists of strips R, S, of metals having different heat coefficients. I have found that strips of iron and brass associated together will answer the required purposes. These strips may be conveniently mounted in any suitable manner. I have shown them attached at one end to a plug T, carried in the end of a hollow handle U, of the instrument. The rod N rests on the free ends of these thermo-strips. If desired the rod N may be held and guided in its longitudinal movements through sleeve D, by any suitable means, as, for instance, by means of a barrel V, operating through an opening in a bracket W, inside the casing. A spring X, interposed between the bracket W, and a collar on the rod N, serves to hold the latter in bearing contact against the free end of the thermal strips.

The operation is exceedingly simple. Variations in atmospheric temperature affect the thermal strips R, S, and cause the rod N, to be moved longitudinally through the sleeve D, thereby shifting the member C, with relation to the rotating magnetic field produced between the magnet and mass, and consequently varying the number of lines of force of the rotating magnetic field cut by the member to vary the rotative pull or drag exerted by such field upon the member. Since the position of the member within the rotating magnetic field is varied by and in accordance with variations in temperature, it will be seen that any variation in magnetic conditions caused by the temperature changes is compensated for automatically, and since the magnet and magnetic mass are not movable toward and from each other the adjustments of the member in the space between the magnet and mass, vary the number of lines of force cut by the member. I am therefore enabled to avoid irregularities caused by adjustments of the magnet and mass toward and from each other which adjustments create conditions that can be accurately compensated only by an irregular and uneven scale graduation, and this is objectionable in devices of this nature. The rotative movement imparted to the member under the influence of the rotating magnetic field, is against the action of spring P, while the pointer O, carried by the spindle on which the member is secured, coöperating with the graduated scale, indicates the speed.

While I have shown my invention as applied to a structure in which the rotating magnetic field is produced by a magnet and a magnetic mass; one of which is stationary and the other mounted to rotate, it will, of course, be understood that the adjustments of the oscillating disk in the rotating field, effected by variations of atmospheric temperature, are not dependent upon any particular construction or arrangement for producing the rotating magnetic field, the important feature of my invention being the adjustments of the oscillatory member with reference to the rotating magnetic field so as to vary the number of lines of force of the field cut by the member, thereby varying the rotative pull or drag exerted on the member, said adjustments being accomplished by variations in atmospheric temperature. My invention, therefore, is not to be limited or restricted in respect to the means employed for producing the rotating magnetic field by which the member is influenced.

Many variations and changes in the details of construction and arrangement of parts may readily suggest themselves to persons skilled in the art, and still fall within the spirit and scope of my invention. I do not desire, therefore, to be limited or restricted to the exact details shown and described. But Having now set forth the object and nature of my invention, and a construction embodying the principles thereof, what I claim as new and useful and of my own invention, and desire to secure by Letters Patent is:—

1. In a tachometer, the combination of means for creating a rotating magnetic field, a member arranged within the influence of said field to be rotated thereby, means for yieldingly opposing said rotation, and means for supporting said member including a thermostatic device, whereby the relation of the member with respect to the rotating field is varied according to variations in atmospheric temperature, to vary the lines of force effective to rotate said member.

2. In a tachometer, the combination of means for creating a rotating magnetic field, a member arranged within the influence of said field to be rotated thereby, means for yieldingly opposing said rotation, and means operated by variations in atmospheric temperature for moving the member in said field to vary the number of lines of force of said field cut by said member.

3. In a tachometer, the combination of means for creating a rotating magnetic field, a member arranged within the influence of said field to be rotated thereby, means for yieldingly opposing said rotation, a spindle on which said member is supported, and means for supporting said spindle including a thermostatic device, whereby the relation of the member with reference to the rotating field is varied according to variations in atmospheric temperature, to vary the number of lines of force of the rotating field cut by the member.

4. In a tachometer, a magnet and a magnetic mass, a member arranged to extend into the space between said mass and magnet, means for causing relative movement of the magnet and magnetic mass, to create a rotating magnetic field in said space, and means to form a support for said member, including metal strips having different heat coefficients.

5. In a tachometer, a magnet and a magnetic mass, a rotatable sleeve carrying one of these parts, a rod longitudinally movable through said sleeve, means for supporting said rod including a thermostatic device, and a member carried by said rod, said member being interposed between said mass and magnet.

6. In a tachometer, a magnet and a magnetic mass, a rotating support for one of these parts, a rod longitudinally movable through said support, a member interposed between said magnet and mass, a spindle upon which said member is mounted, said spindle being supported upon said rod, and means for supporting said rod including a thermostatic device.

In testimony whereof I have hereunto set my hand in the presence of the subscribing witnesses, on this 5th day of May A. D., 1910.

ADDI BENJAMIN CADMAN.

Witnesses:
W. A. ROSE,
W. H. GRAGG.